2,882,288

ORGANO-VANADIUM HALIDES AND PROCESS OF PREPARATION

John C. Brantley and Edward L. Morehouse, Snyder, N.Y., assignors to Union Carbide Corporation, a corporation of New York No Drawing. Application September 23, 1953
Serial No. 381,968

11 Claims. (Cl. 260—429)

This invention relates to organo-metallic compounds containing vanadium as the metal component. The invention includes correlated improvements and discoveries whereby such vanadium compounds having distinctive properties are obtained.

An object of the invention is to provide organo-metallic compounds containing vanadium as the metallic component linked to the organic component by carbon to metal bonds.

A further object of the invention is to provide a method for producing such organo-vanadium compounds.

Other objects of the invention will in part be obvious and will in part appear hereinafter.

The products of this invention have the general empirical formula:

where R is a residue of an organic compound containing a five carbon ring, alicyclic in character, which is hereinafter designated an "alicyclic cyclopentadienyl carbon ring" and has the structure:

X is halogen and $n$ is 0, 1 or 2.

The alicyclic character of the carbon ring is essential for purposes of this invention. For example, both cyclopentadiene and indene contain an alicyclic cyclopentadienyl ring structure; cyclopentadiene having no double bond coordinately shared with an aromatic ring and indene having only one double bond of the cyclopentadienyl ring coordinately shared with an aromatic ring. In contrast, the five carbon ring in fluorene, where each of the double bonds in such ring is coordinately shared with an aromatic ring, is not alicyclic in character and fluorene thus does not contain an alicyclic cyclopentadienyl ring structure.

In the practice of this invention an organo-magnesium halide of an organic compound containing an alicyclic cyclopentadienyl carbon ring may be formed and then reacted with a vanadium halide to produce the desired organo-metallic compound. It is to be understood that the term "vanadium halide" as used herein includes oxyhalides as well as halides which contain no oxygen. Thus included within the term are compounds having the general formula $VX_2$, $VX_3$, $VX_4$, $VX_5$, $VOX_2$ and $VOX_3$ where X is halogen.

The organo-magnesium halide, hereinafter referred to as a "cyclopentadienyl carbon ring Grignard reagent" has the general formula RMgX wherein R and X are as described above. The organic compound containing the alicyclic cyclopentadienyl carbon ring which is to be reacted with a lower alkyl magnesium halide for production of the cyclopentadienyl carbon ring Grignard reagent should, before its combination in the Grignard reagent, contain a reactive hydrogen on the methylene carbon of the alicyclic cyclopentadienyl carbon ring, but the number and character of substituents on the cyclopentadienyl carbon ring may otherwise be varied at will. Suitable organic compounds include hydrocarbon compounds having the requisite alicyclic cyclopentadienyl carbon ring. Examples of such hydrocarbon compounds are cyclopentadiene, its aliphatic derivatives as for example methyl, ethyl, allyl and vinyl cyclopentadiene, its aromatic derivatives as for example phenyl cyclopentadiene, indene and its comparable derivatives.

The formation of a dihalide according to this invention may be illustrated by the reaction between cyclopentadienyl magnesium chloride and $VCl_4$. The Grignard reagent may be prepared by reacting magnesium turnings with a lower alkyl chloride in a solvent, ethyl ether, benzene or the like for example, and reacting the resulting solution with cyclopentadiene. The cyclopentadienyl magnesium chloride thus formed is then reacted with $VCl_4$ in a suitable liquid medium and the organo-vanadium dichloride $(C_5H_5)_2VCl_2$ may be recovered from the reaction mixture. The same compound results from reaction of cyclopentadienyl magnesium chloride with $VOCl_3$. When the halide in the cyclopentadienyl carbon ring Grignard reagent is different from that in the vanadium halide the reaction product may contain a mixture of dihalides or a mixture of dihalides and mixed dihalide and will have an apparent average empirical formula:

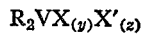

where X and X' are different halogens and $(y)$ and $(z)$ are numbers which total 2, i.e. any such numbers between 0 and 2, depending on the proportions of the particular halogens present in combined state. By reaction with dilute aqueous HCl $(C_5H_5)_2VCl_{(y)}Br_{(z)}$ may be converted into $(C_5H_5)_2VCl_2$.

The reaction of the cyclopentadienyl carbon ring Grignard reagent with vanadium halide is preferably initially conducted at temperatures between about 0° C. and —90° C. At temperatures above 0° C. the initial reaction of the vanadium halide with the Grignard reagent results in a substantial amount of undesirable decomposition products and the yield is thus substantially reduced. The liquid medium in which the reaction takes place should thus be chosen to give fluid mixtures which can easily be stirred at the low reaction temperatures. Ether or ether-toluene mixtures are well adapted as solvents for this purpose. After the reaction has progressed sufficiently at the selected low temperature, it may be continued at a higher temperature, preferably between about 10° C. to 40° C., whereby further reaction is promoted.

A wide range of ratios of reactants may be employed. Ratios of $R_2MgX$ to vanadium halide of from 1:1, or less, to 5:1, or higher, may be used.

The organo-metallic compounds of this invention may also be produced by formation of an alkali metal derivative of an organic compound containing the cyclopentadienyl carbon ring and reaction of the resulting organo-alkali metal compound with a vanadium halide as disclosed and claimed in co-pending application of Lynch and Brantley entitled "Process for Producing Organo-metallic Compounds," Serial No. 381,970 and filed of even date. However the process there disclosed and claimed forms no part of this invention.

In general, reaction according to that process of a suitable organo-alkali metal compound with lower valence vanadium halides tends to result in production of an organo-vanadium monohalide or non-halogenated organo-vanadium compounds. However these compounds are quite sensitive to oxidation, the dihalides being much more stable under oxidizing conditions. The monohalides have the general formula $R_2VX$ while the non-halogenated compounds have the general formula $R_2V$. The organo-vanadium compounds of this invention are in general colored crystalline solids. The physical properties of the organo-vanadium dihalides vary with variations in the halogen and in the organic component. They are soluble in water and acids, undergoing some decomposition. Their solubility in chloroform is very low although continuous extraction of the dry halides in warm $CHCl_3$ gives a method for purification and recrystallization. In general, they decompose without melting and are insoluble to very slightly soluble in most organic solvents.

Variations in properties are also apparent in employment of alkyl or aromatic substituted cyclopentadiene or indenes. Increased volatility, lower melting points and greater solubility in organic solvents is to be encountered with the bis(alkylcyclopentadienyl) and bis(arylcyclopentadienyl)vanadium dihalides.

The compounds of this invention may, by reason of color, be employed as coloring agents. They may also serve as oil driers and as oxidation catalysts.

As illustrative embodiments of a manner in which the invention may be practiced, the following examples are presented. In each example an inert protective atmosphere of nitrogen or other inert gas was employed during formation of the Grignard reagents and their reaction with vanadium halides.

*Example I*

1 mole of $C_5H_5MgBr$ was prepared by reacting 24 grams of finely divided magnesium metal with 1.05 moles of methyl bromide in 400 ml. of ether and slowly adding to the reaction mixture 1 mole of cyclopentadiene. The reaction mixture was then refluxed for four hours to complete the reaction. A solution of .24 mole of vanadium tetrachloride was prepared in 150 ml. of toluene and was added dropwise to the $C_5H_5MgBr$ solution at 0° C. with stirring. The reaction mixture turned blue, but the color changed to green on exposure to air.

The reaction mixture was hydrolyzed in ice-cold 6% HCl solution resulting in a green acid layer, a green organic layer and some green solid. The green solid was recrystallized from chloroform to yield green crystals. The organic layer yielded more of the same green crystalline product. The water layer was evaporated to dryness under reduced pressure and the greenish-white residue was extracted with chloroform which yielded by crystallization more of the product. The product was a mixture of $(C_5H_5)_2VCl_2$ and $(C_5H_5)_2VBr_2$.

*Example II*

15.5 grams of $VOCl_3$ was dissolved in 450 ml. of benzene. The solution was cooled to 0° C. and 155 ml. of a solution of .267 mole of $C_5H_5MgBr$ in ethyl ether was added dropwise with vigorous stirring. Stirring was continued for one-half hour after completion of the addition of the cyclopentadienyl magnesium bromide solution and the reaction mixture was allowed to stand overnight at room temperature, still under nitrogen. The reaction mixture was hydrolyzed using 400 ml. of water and ice and 24 ml. of concentrated HCl. The hydrolysis products were filtered yielding a brown filter cake, a green acid solution and a yellow organic layer. There was no organo-vanadium compound in the organic layer. The water layer when concentrated under reduced pressure deposited green crystals which were found to have an average formula $(C_5H_5)_2VCl_{1.04}Br_{0.96}$. This mixture of compounds is soluble in water and in acids but only slightly soluble in chloroform and benzene and insoluble in petroleum ether. It is soluble in acetone but with decomposition of the compound in solution when heated in air. The compound decomposes when heated above 250° C. without melting.

*Example III*

This and the succeeding example indicate preparation of compounds of this invention by methods disclosed and claimed in the co-pending application of Lynch and Brantley entitled "Process for Producing Organo-metallic Compounds," Serial No. 381,970, and filed of even date. It is to be understood however that such methods of preparation form no part of the present invention.

A suspension of sodium cyclopentadiene was prepared by adding 92 ml. of cyclopentadiene to 22.4 grams of finely divided sodium sand in 450 ml. of ethylene glycol dimethyl ether. A solution of vanadium tetrachloride in ethylene glycol dimethyl ether was prepared by adding 94 grams of $VCl_4$ to 250 ml. of the solvent which was cooled in an ice water bath. The $VCl_4$ solution was added to the sodium cyclopentadiene suspension using an ice bath to control the temperature of the exothermic reaction. After warming to room temperature, the viscous reaction product was filtered. Succeeding operations were carried out without a protective atmosphere. The filter cake of reaction solids was extracted with chloroform in a Soxhlet extractor. The filtrate from the reaction products was evaporated to dryness under a vacuum and the solid residue was also extracted with chloroform in the Soxhlet extractor. Because of the low solubility of $(C_5H_5)_2VCl_2$ in chloroform the extractions required several days. Green crystals of $(C_5H_5)_2VCl_2$ were obtained by crystallization from the chloroform extracts.

*Example IV*

A slurry of sodium cyclopentadiene was prepared by suspending 11.9 grams of finely divided sodium sand in 250 ml. of ethylene glycol dimethyl ether and adding 39.2 grams of cyclopentadiene at 20°-25° C. A slurry of vanadium oxytrichloride was prepared in ethylene glycol dimethyl ether by adding 30 grams of $VOCl_3$ dropwise to 400 ml. of the solvent at 6°-10° C. With external cooling of the reaction flask to maintain the temperature at −25° during the mixing, the suspension of $NaC_5H_5$ was added to the stirred vanadium oxytrichloride suspension. After the addition was complete, the mixture was stirred for an hour while the temperature of the flask was raised to room temperature. The mixture was dark purple.

The reaction mixture was hydrolyzed with 200 ml. of concentrated hydrochloric acid and ice. The hydrolyzate was extracted with benzene to remove any organic material and the aqueous acid layer was a dark green and was concentrated on a water bath with a current of nitrogen flowing over the surface. After concentrating to 100 ml. volume, water was added and the mixture was filtered. The filtrate was again concentrated to 400 ml. volume. On cooling 6.9 grams of green crystalline $(C_5H_5)_2VCl_2$ were obtained.

Since certain changes in carrying out the above process and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent is:

1. An organo-vanadium compound having the empirical formula:

wherein R is an organic hydrocarbon residue of the group consisting of cyclopentadienyl and indenyl, and lower alkyl, lower alkenyl and phenyl derivatives thereof, X represents a halogen and $n$ is a positive whole number less than 3.

2. An organo-metallic composition having the apparent average empirical formula:

where $C_5H_5$ is cyclopentadienyl, X and X' are different halogens and $(y)$ and $(z)$ are numbers which total 2.

3. An organo-metallic composition having the apparent average empirical formula:

$$(C_5H_5)_2VCl_{(y)}Br_{(z)}$$

wherein $C_5H_5$ is cyclopentadienyl and $(y)$ and $(z)$ are numbers which total 2.

4. An organo-metallic compound having the empirical formula:

$$(C_5H_5)_2VCl_2$$

wherein $C_5H_5$ is cyclopentadienyl.

5. A process for the preparation of organo-vanadium halides which comprises reacting a vanadium halide with a reagent having the formula:

$$R \cdot Mg \cdot X$$

wherein R represents a residue of an organic compound of the group consisting of cyclopentadienyl and indenyl, and lower alkyl, lower alkenyl and phenyl derivatives thereof and X represents a halogen.

6. A process as defined in claim 5 characterized by the vanadium halide being $VCl_4$.

7. A process as defined in claim 5 characterized by the vanadium halide being $VOCl_3$.

8. A process for the preparation of organo-vanadium dihalides having the general empirical formula:

$$R_2VX_{(y)}X'_{(z)}$$

wherein R represents an organic hydrocarbon residue of the group consisting of cyclopentadienyl and indenyl, and lower alkyl, lower alkenyl and phenyl derivatives thereof, X and X' are different halogens and $(y)$ and $(z)$ are numbers which total 2, which comprises reacting a vanadium halide containing the halogen X as its halogen component with a reagent having the formula $R \cdot Mg \cdot X'$ wherein R and X' are as defined herein in a liquid medium at a temperature between about 0° C. and —90° C.

9. A process as defined in claim 8 in which X is chlorine and X' is bromine.

10. A process for the preparation of organo-vanadium halides which comprises reacting a vanadium halide with a reagent having the general formula:

$$R \cdot Mg \cdot X$$

wherein R represents an organic hydrocarbon residue of the group consisting of cyclopentadienyl and indenyl, and lower alkyl, lower alkenyl and phenyl derivatives thereof and X represents a halogen, in a liquid medium under an inert atmosphere at a temperature between about 0° C. and —90° C., warming the reaction mixture to at least 10° C. and allowing the reaction to proceed further at said higher temperature and recovering the organo-vanadium halide.

11. A process for the preparation of organo-vanadium halides which comprises reacting a vanadium chloride with a compound of the general formula:

$$R \cdot Mg \cdot X$$

wherein R represents an organic hydrocarbon residue of the group consisting of cyclopentadienyl and indenyl, and lower alkyl, lower alkenyl and phenyl derivatives thereof and X represents a halogen at a temperature between about °0 C. and —90° C.

References Cited in the file of this patent

Wilkinson et al.: J. Am. Chem. Soc., vol. 75, pp. 1011–1012, February 20, 1953 (received January 15, 1953).